Patented Oct. 2, 1951

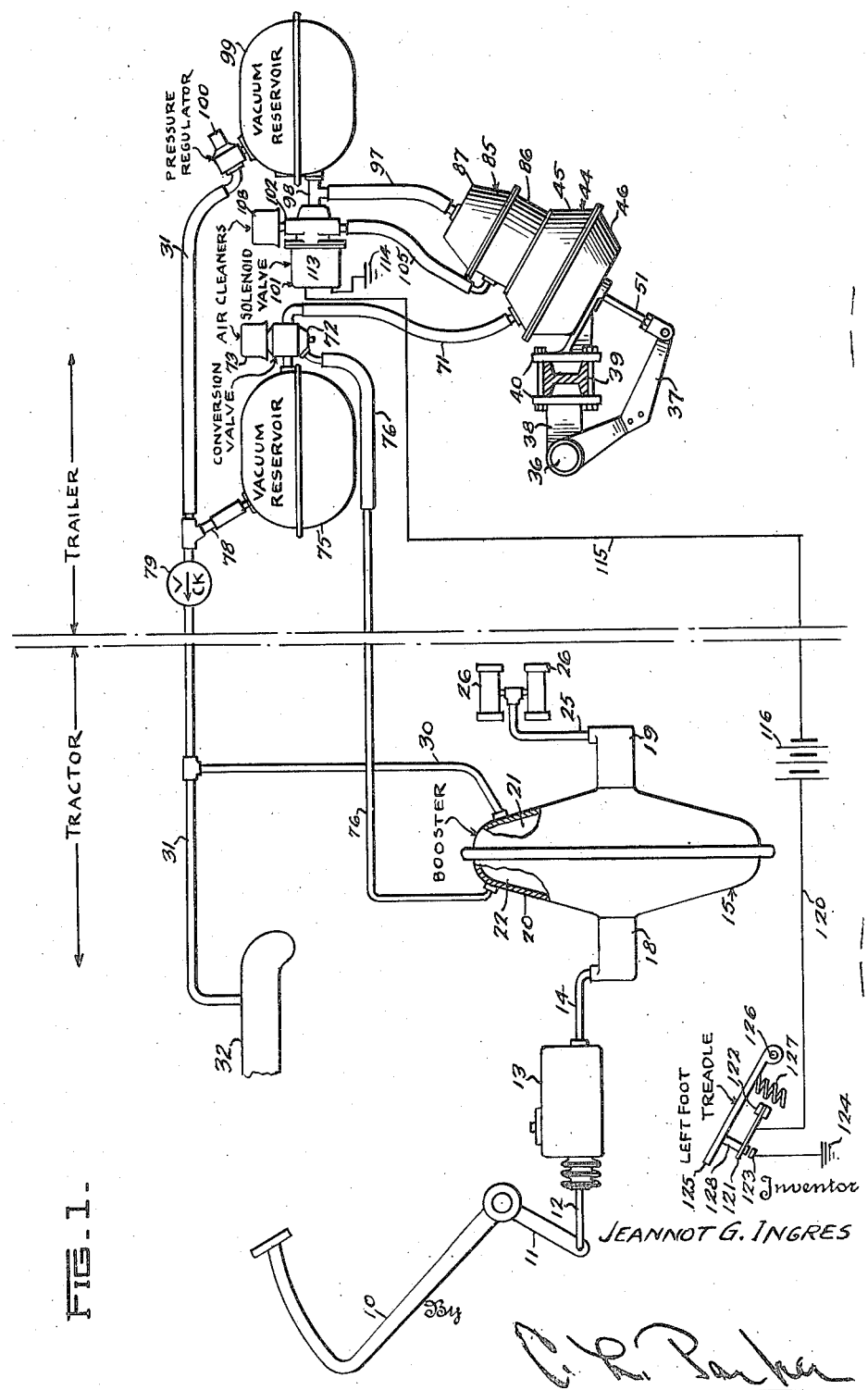

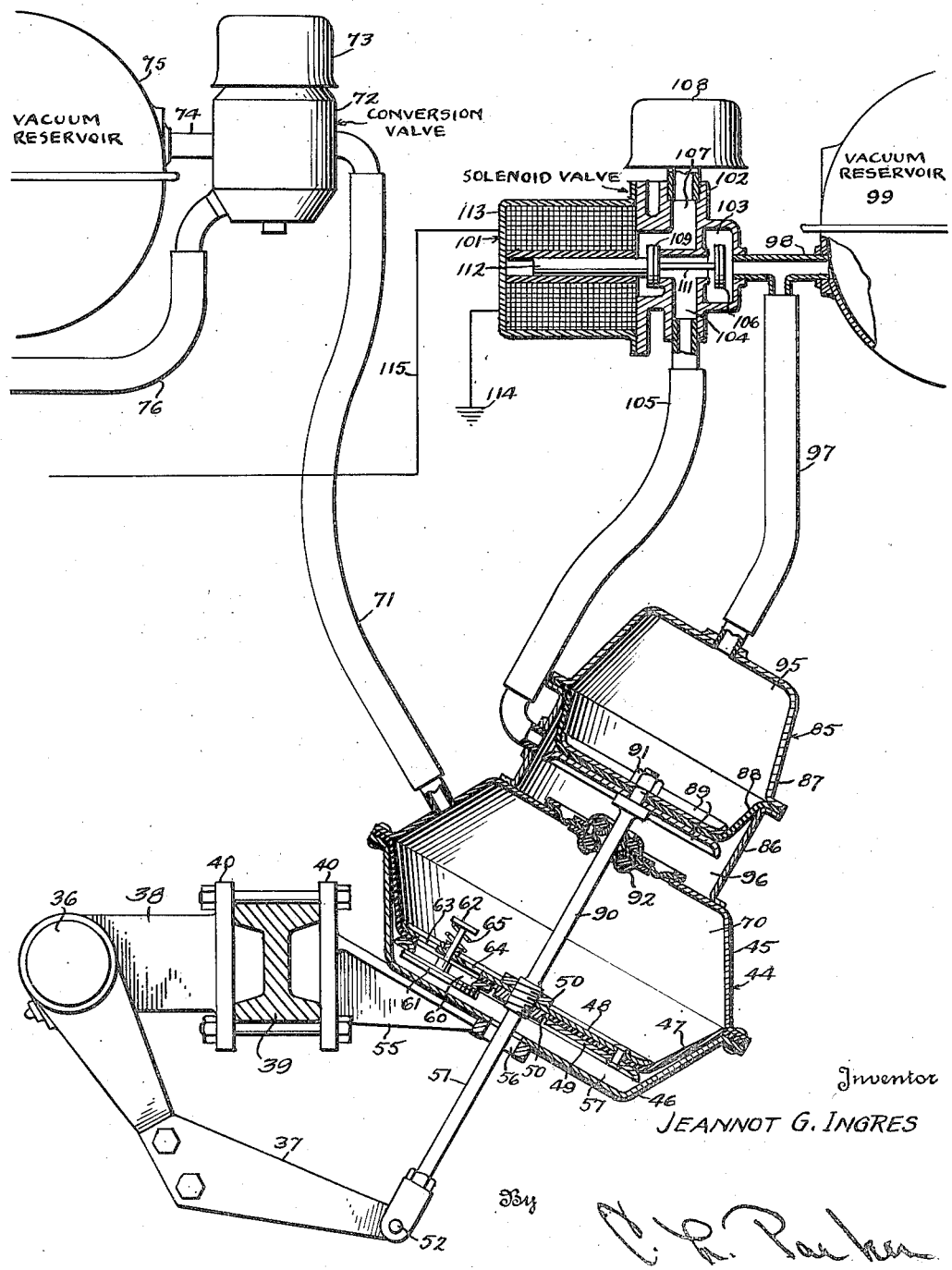

2,569,610

UNITED STATES PATENT OFFICE 2,569,610

TRACTOR-TRAILER BRAKE SYSTEM

Jeannot G. Ingres, Richmond, Va., assignor to Kelsey Hayes Wheel Company, Detroit, Mich., a corporation of Delaware Application January 15, 1948, Serial No. 2,511

17 Claims. (Cl. 188—3)

This invention relates to tractor-trailer brake systems.

It has been the conventional practice for a number of years to provide tractor-trailer combinations with brake systems wherein a power booster is employed for the tractor brakes and brake applying motors are employed for applying the trailer brakes, such motors being dependent upon energization of the tractor booster mechanisms to be energized upon operation of the tractor brake pedal. Because of the lengths of the piping connections between the booster mechanism and the trailer brake motors, there is a definite lag in the operation of the trailer brakes. In order to minimize so-called "jackknifing" it is obviously advisable to apply the trailer brakes ahead of the tractor brakes, and this is impossible with the systems referred to of conventional type because of the time lag occurring between the operation of the tractor brakes and the operation of the trailer brakes.

To overcome this difficulty, it has been the common practice for many years to provide in the cab of the tractor a manually operable valve for dumping air into a chamber of the conversion valve which controls the operation of the trailer brakes in accordance with the operation of the tractor brakes. The manually operable valves referred to permit the drivers to snub the trailer brakes whenever desired, and to effect application of the trailer brakes ahead of the tractor brakes. However, it requires an appreciable length of time after operation of the manual valve for energization of the trailer brake motors to occur and apply the trailer brakes because of the length of the fluid lines from the conversion valve to the hand valve. Therefore, while the hand valve permits snubbing of the trailer brakes independently of operation of the tractor brakes, and permits operation of the trailer brakes ahead of the tractor brakes when all of the brakes are to be applied, it is impossible to provide instantaneous trailer-brake operation when necessary or desirable.

Because of this inadequacy of the systems which have been in use for many years, there has recently been developed a system wherein an additional control valve mechanism is associated with the system and provided with an electrically operable valve adapted to be energized and operated upon initial movement of the brake pedal from its "off" position to effect an instantaneous operation of the trailer brakes. With a system of this character, an initial limited trailer brake operation is effected immediately upon initial depression of the brake pedal, and after the passing of the time interval required for the trailer brake motors to respond to operation of the tractor booster mechanism, the latter takes over the controlling of the trailer brakes and renders the electrically operated valve mechanism inoperative or ineffective for controlling the trailer brakes. The motors of the trailer brakes are thereupon energized to a degree proportionate to the energization of the motor of the tractor booster mechanism.

The recently developed systems referred to constitute an advance in the art of controlling trailer brake mechanisms and minimize accidents due to "jackknifing" while at the same time providing for rapid or emergency braking of both vehicles.

With the later systems of the character referred to, there are still conditions which are not completely taken care of in the operation of tractor-trailer combinations. For example, under some conditions, the snubbing of the trailer brakes alone is not sufficient to prevent "jackknifing" and this condition can be prevented, or overcome after it starts, only by accelerating the motor of the tractor to tend to pull the tractor forwardly away from the trailer while braking the latter. This is impossible with systems of the character referred to since it is necessary for the operator to lift his foot from the accelerator pedal to move the brake pedal to effect the snubbing of the trailer brakes. Moreover, present types of tractor-trailer brake mechanisms do not take into account the fact that it is highly desirable to provide different degrees of brake application of the trailer brakes in accordance with the loads to be decelerated or stopped. Obviously it requires more or longer braking to stop a heavily loaded trailer than one which is traveling light, and since present systems provide a fixed maximum braking effect for the trailer, a heavily loaded tractor-trailer combination must travel much farther in being brought to a stop from a given speed than is true when the trailer is traveling light.

An important object of the present invention is to provide an improved tractor-trailer brake mechanism wherein the operator may secure a snubbing of the trailer brakes at any time wholly independently of the normal braking system, and wherein such snubbing of the trailer brakes is substantially instantaneous.

A further object is to provide such a system wherein instantaneous limited trailer brake actuation takes place independently of operation of the tractor brake pedal but does not interfere with normal braking, thus permitting instantaneous trailer brake operation and normal brake operation to eliminate any lagging of the operation of the trailer brakes and without providing a mechanism which must be rendered inoperative when the tractor booster mechanism takes over the operation of the trailer brakes.

A further object is to provide such a mechanism which includes compound motors for the trailer brakes, the individual motors of which are independently, consecutively or simultaneously operable to provide highly efficient braking forces in accordance with individual conditions and accordance with variations in the loads being carried by the trailers.

More specifically, an object of the invention is to provide compound trailer brake operating motors each of which comprises tandem-connected fluid pressure motors both of which are connected to a trailer brake operating mechanism, and wherein one motor is instantly operable to provide trailer brake snubbing, the other or main motor is operable in accordance with the operation of the tractor booster motor to provide normal braking of the trailer, and both motors of which are operable under the control of the driver to provide extra braking forces when the trailer is heavily loaded.

A further object is to provide compound trailer-brake operating motors each of which comprises a main motor controlled in accordance with the tractor booster mechanism and an auxiliary motor instantly operable at the will of the driver, and to so arrange and connect such motors that the operation of the auxiliary motor displaces air from the variable pressure chamber of the main motor, thus reducing to a minimum the amount of air which must be drawn from the main motor into the vacuum reservoir, when the main motor is operated by the tractor booster motor, thus nearly eliminating a drop in vacuum in the vacuum storage tank to render a main motor of a given size capable of delivering greater power to the trailer brake than is possible with present systems.

A further object is to provide such a system wherein the auxiliary trailer brake motors are conveniently controlled by the left foot of the operator, thus eliminating the necessity for a hand valve and permitting the driver to snub the trailer brakes by movement of his left foot and depress the accelerator pedal with the right foot to accelerate the tractor motor, thus eliminating all danger of "jackknifing."

Other objects and advantages of the invention will become apparent during the course of the following description.

In the drawings, I have shown one embodiment of the invention. In this showing:

Figure 1 is a schematic view of the tractor-trailer brake system, and

Figure 2 is an enlarged fragmentary sectional view of one of the trailer brake compound motors and associated control means, parts being broken away and parts being shown in elevation.

Referring to Figure 1, the numeral 10 designates a conventional tractor brake pedal having an arm 11 connected by a rod 12 to the piston (not shown) of a conventional master cylinder 13. Operation of the brake pedal 10 displaces hydraulic fluid from the master cylinder 13 through a pipe 14 to operate a booster mechanism indicated as a whole by the numeral 15. This booster mechanism may be of any desirable type and preferably is of the type fully disclosed in the patent to Rudolph J. Klimkiewicz No. 2,377,699, granted June 5, 1945.

The booster mechanism has a low pressure end 18 into which fluid flows from pipe 14. The fluid in the low pressure end 18 generates pressure in the high pressure end 19 and at the same time operates a valve mechanism to energize the booster motor 20 which is provided with a constant pressure chamber 21 and a variable pressure chamber 22. Energization of the booster motor assists the manual pressure delivered to the high pressure end 19 to generate therein a pressure substantially higher than the pressure developed by depression of the brake pedal 10, and such high pressure fluid is delivered through suitable piping 25 to the tractor brake cylinders 26. Only two of the brake cylinders have been shown in Figure 1, but it will be obvious that the usual number will be employed.

In accordance with the disclosure of the Klimkiewicz patent referred to, the constant pressure chamber 21 is connected to a suitable source of vacuum by a pipe 30 tapped into a pipe 31 leading to the intake manifold 32 of the tractor engine. The valve mechanism (not shown) for the booster motor normally connects the chambers 21 and 22, thus vacuum suspending the booster motor. Upon the delivery of hydraulic fluid into the low pressure end 18, the valve mechanism disconnects the chambers 21 and 22 and admits air into the chamber 22 to actuate the booster motor.

The trailer is provided with any desired number of brakes, only one operating mechanism for which is illustrated in the drawings. It will be obvious, however, that any number of brakes may be employed and each will be provided with an operating mechanism. Each of the trailer brakes includes an operating shaft 36 operable by an arm 37. The shaft 36 is supported by a bracket 38 secured in position around one of the axles 39 by a clamping device 40 including the plates and bolts shown in Figures 1 and 2.

Each arm 37 is operable by a fluid pressure motor 44, shown in detail in Figure 2. This motor comprises casing elements 45 and 46 between the flanges of which is clamped the periphery of a flexible diaphragm 47, and the center portion of the diaphragm is clamped between plates 48 and 49. Nuts 50 fix the diaphragm unit to an operating rod 51 pivotally connected as at 52 to the free end of the arm 37. The motor 44 is supported by a bracket 55 carried by one of the plates of the clamping device 40, and this bracket and the casing element 46 axially thereof are apertured as at 56 to connect the motor chamber 57 to the atmosphere and to provide space for movement of the rod 51 incident to the moving of the pivot 52 about the axis of the shaft 36.

The plate 49 is stamped to provide an opening 60 normally closed by a relief valve 61. This valve is carried by a stem 62. The plate 48 is apertured as at 63 and into this aperture extends an arm 64 formed integral with the plate 48 to slidably support the stem 62. The relief valve 61 is urged to closed position by a spring 65.

The motor 44 also includes a variable pressure chamber 70, and the motor 44 is normally air-suspended as is true of most trailer brake operating motors. The variable pressure chamber 70 is connected by a conduit 71 to a conventional conversion valve 72 having the usual air cleaner 73. The conversion valve is connected by a pipe 74 to the usual vacuum storage tank 75. As is customary in devices of this character, the conversion valve is connected by a conduit 76 to the variable pressure chamber 22 of the booster motor. Inasmuch as the conversion valve 72 is conventional, it need not be illustrated in detail. It will be understood that in accordance with the usual operation of such device, the conduit 71 is normally connected to the atmosphere. When the booster motor is energized, the pressure in the chamber 22 of the booster motor rises and this rise in pressure is communicated through conduit 76 to the proper chamber of the conversion valve to disconnect the pipe 71 from the atmosphere and connect it to the vacuum reservoir 75. This reservoir has a pipe 78 tapped into the vacuum line 31 of the brake manifold to maintain the proper degree of vacuum, usually about 20 inches of mercury, in the reservoir 75. A check valve 79 is arranged between the pipe 78 and the intake manifold. This check valve is normally open to reduce line friction, but upon any breaking of the conduit 31, the check valve 79 immediately closes to hold the vacuum in the reservoir.

The elements thus far described constitute a conventional tractor-trailer brake operating system, as will be apparent. The present invention supplements and cooperates with such system to provide the highly advantageous results referred to below.

The motor 44 constitutes the main operating motor for each trailer brake and an auxiliary motor indicated as a whole by the numeral 85 is associated with the motor 44, preferably but not necessarily, in the relationship shown in Figure 2. In the present embodiment of the invention the motor 85 comprises casing sections 86 and 87, the former of which is preferably cylindrical and secured to the top of the casing element 45 coaxially therewith. A diaphragm 88 has its periphery clamped between the peripheral portions of the casing sections 86 and 87. The central portion of the diaphragm 88 is arranged between clamping plates 89, as shown in Figure 2. The rod 51 is provided with an axial extension 90 passing through the top wall of the casing 45 and through the diaphragm 88 and plates 89, being secured to the latter as at 91. The top wall of the casing 45 is provided with a conventional flexible bushing 92 to provide a seal around the slidable rod section 90 while at the same time permitting the slight degree of lateral movement of the rod 90 at that particular point, incident to movement of the pivot 52 around the axis of the shaft 36.

The diaphragm 88 divides the motor 85 into a constant pressure chamber 95 and a variable pressure chamber 96. The chamber 95 is connected by a conduit 97 to a T 98, one end of the run of which communicates with the interior of an auxiliary vacuum reservoir 99. As shown in Figure 1, this reservoir is connected to the pipe 31 through a conventional pressure regulator 100, the function of which is to maintain in the reservoir 99 any desired degree of vacuum lower than the vacuum in the reservoir 75, for example, from 5 to 7 inches of mercury. The pressure regulator 100 is conventional and accordingly need not be illustrated in detail.

A valve mechanism indicated as a whole by the numeral 101 controls the operation of each auxiliary motor 85. The valve mechanism 101 comprises a valve body 102 having a chamber 103 therein in constant communication with the other end of the run of the T 98. The valve body further comprises a chamber 104 in constant communication with one end of the pipe 105 leading to the variable pressure chamber 96. A valve 106 controls communication between the chambers 103 and 104 and is normally open as in Figure 2 so that the motor 85 is normally vacuum suspended. The valve body 102 further comprises a chamber 107 open to the atmosphere through a conventional air cleaner 108. A normally closed valve 109 controls communication between the chambers 104 and 107.

The valves 106 and 109 are connected by a stem 111 and at its opposite side, the valve 109 is connected to an armature 112 of a solenoid 113. Upon energization of this solenoid, the armature 112 will move toward the left in Figure 2 to open the valve 109 and close the valve 106.

One terminal of the solenoid 113 is grounded as at 114 and the other terminal is connected to a wire 115 leading to the vehicle battery or other source 116 (Figure 1). The other terminal of the battery 116 is connected by a wire 120 to a switch arm 121 of the spring type having one end anchored as at 122. The spring arm 121 is movable into engagement with a contact 123 grounded as at 124. A treadle 125 is arranged at a convenient point in the cab of the tractor and preferably in such position as to be depressed by the left foot of the driver. This treadle is pivotally supported at one end as at 126 and is urged upwardly by a spring 127, and the opposite end of the treadle carries a depending finger 128 engageable with the spring arm 121 to engage it with the contact 123 upon depression of the treadle 125.

Operation

The operation of the brake pedal 10 accomplishes the same results as in conventional tractor-trailer brake mechanisms. The motor 20 of the booster is normally vacuum suspended, and upon operation of the brake pedal 10 fluid is displaced from the master cylinder 13 into the low pressure end 18 of the booster. This operation energizes the booster motor, and this motor and the manual pressure delivered to the low pressure end 18 of the booster combine to generate a relatively higher pressure in the high pressure end 19 to apply the tractor brakes in the usual manner.

The operation of the conventional valve mechanism of the booster 20 disconnects the chamber 21 and 22 and supplies air to the chamber 22, all as fully disclosed in the Klimkiewicz Patent No. 2,377,699, referred to above. It will be apparent, of course, that while the Klimkiewicz type of booster is preferred, the present system is operable with any desired type of brake booster mechanism. The raising of the pressure in the chamber 22 incident to the supplying of air thereto results in the controlling of the conversion valve 72 after an appreciable length of time necessary for the increased pressure in the chamber 22 to affect the control chamber (not shown) of the conversion valve 72 through the conduit 76. When this occurs the conversion valve performs its normal function of cutting off communication between the atmosphere and the variable pressure chamber 70 of each trailer brake motor 44 and the connecting of such chamber to the vacuum reservoir 75. This exhausts air from the chamber 70 of each trailer brake motor, and differential pressures actuate the diaphragm 47 of each motor 44 to rock the corresponding arm 37 of the shaft 36 to apply the trailer brakes. As is well known and fully understood in the art, the conversion valve 72 functions to energize the trailer brake motors 44 to a degree proportionate to energization of the booster motor 20. Thus the tractor and trailer brakes both will be applied to decelerate or stop the tractor-trailer.

The system as just described is fully conventional and it is well known that there is an appreciable time lag between the application of the tractor brakes and the application of the trailer brakes. This is due to the appreciable length of time necessary for the conversion valve to respond to energization of the booster motor 20. It is customary in systems of this kind to provide in the cab of the tractor a hand valve which the driver may operate to dump air into the conversion valve to energive the trailer brake motors. This hand valve is frequently operated alone to provide a snubbing action of the trailer brakes, and is used by the operator prior to the application of the tractor brakes by operation of the brake pedal 10 to insure the applying of the trailer brakes ahead of the tractor brakes to prevent jackknifing. The hand valve is not employed with the present system for a reason which will become apparent.

In recently developed systems, an extra valve mechanism, controlled by a solenoid, has been interposed in the conventional tractor-trailer brake system. The solenoid of such valve mechanism is energized upon initial depression of the brake pedal to effect an instantaneous energization of the trailer brake motors so as to insure the application of the trailer brakes ahead of the tractor brakes. After a sufficient interval of time necessary for the conversion valve to be operated in accordance with energization of the booster motor, the solenoid-controlled valve mechanism passes out of operation and the controlling of the trailer motors is then taken over by the booster motor. Such a system is a distinct advance in the art of tractor trailer brake systems but still leaves much to be desired. For example, it is possible to eliminate the hand valve since the driver, whenever snubbing of the trailer brakes alone is desired, could slightly move the brake pedal and thus apply the trailer brakes to a limited extent instead of using the hand valve for this purpose. However, the trailer brakes are frequently snubbed and drivers object to having to often lift their right foot from the accelerator pedal to the brake pedal and slightly move the latter and hold it in a trailer brake applying position for the desired length of time, and then again place the foot back on the accelerator pedal. To prevent this frequent shifting of the right foot, it is still desirable even if not necessary to use the conventional hand valve.

With the latter systems it is still impossible, without the use of a hand valve, to snub the trailer brakes and at the same time accelerate the tractor motor to tend to pull the tractor and trailer relatively away from each other to prevent or overcome "jackknifing." With the latter systems referred to, if "jackknifing" is anticipated or has commenced, the driver must lift his foot from the accelerator pedal and slightly depress the brake pedal to snub the trailer brakes. The left foot having been removed from the accelerator pedal, the driver can not then conveniently accelerate the tractor engine simultaneously with the snubbing of the trailer brakes.

All prior tractor-trailer brake systems of which I am aware also wholly fail to take into account the desirability for providing variable braking forces for the trailer in accordance with the extent to which the latter is loaded. Present trailer brake power mechanisms accordingly are compromises in that they do not provide sufficient braking action for heavily loaded trailers, but provide entirely too much braking for the trailer when the latter is running light.

The present system overcomes all of the disadvantages of both the conventional and lately developed systems. Assuming that the driver desires to snub the trailer brakes, for example, to prevent vehicle acceleration when running down an incline, it merely is necessary for him to depress his left foot on the treadle 125 to close the switch 121, 123. Current will then flow from battery 16 through wire 120, switch elements 121 and 123, through grounds 124 and 114 (Figures 1 and 2), thence through the solenoid 113, and back to the source through wire 115. The valves of the mechanism 101 (Figure 2) normally occupy the positions shown in Figure 2 and both chambers 95 and 96 of the auxiliary motor 85 will be in communication with the vacuum reservoir 99. Accordingly the diaphragm 88 is normally vacuum suspended. Upon energization of the solenoid 113, the armature 112 will move to the left, as viewed in Figure 2, to close the valve 106 and open the valve 109. The chambers 103 and 104 will then be disconnected and the chamber 104 will be connected to the atmospheric chamber 107.

This operation dumps air into the chamber 96 of the auxiliary motor 85 while the chamber 95 remains in constant communication with the vacuum reservoir 99. Accordingly, air pressure will act on the bottom of the diaphragm 88 to pull the rod 90 upwardly and rock the arm 37 and shaft 36 to apply the trailer brake. The same operation applies to all of the trailer brakes, the motor mechanisms of which are identical. The motor 85 is of smaller capacity than the motor 44 and lower vacuum is preferably maintained in the reservoir 99 by the pressure regulator 100. This vacuum ordinarily will be from 5 to 7 inches of mercury and in practice this has been found to provide an effective snubbing action at the trailer brakes.

The operator may drive the vehicle with his left and right feet resting respectively on the treadle 125 and on the accelerator pedal. The spring 127 is sufficiently strong to support the weight of the operator's left foot, and accordingly he can drive comfortably with his left foot resting on the treadle 125. Only a slight and easily applied pressure is necessary to depress the pedal 125 to energize the auxiliary motor 85. Thus the operator at any time may easily snub the trailer brakes and this is an operation which is frequently performed by the operator.

It is unnecessary for the operator to move his hands from the steering wheel, and accordingly the brake-snubbing operation may be more easily carried out than with the use of a hand valve.

The operation of snubbing the trailer brakes without operating the tractor brakes is a wholly independent operation. However, the present mechanism as just described cooperates with the rest of the system in a highly improved manner when a full braking operation is desired. When such operations are to be performed, the operator will depress the pedal 125 to accomplish the above described results. He will also place his foot on the brake pedal 10 and depress it in the usual manner. The energization of each auxiliary motor 85 instantly applies the trailer brakes to prevent jackknifing and since upward movement of the diaphragm 88 (Figure 2) pulls upwardly on the rod 90, it follows that the diaphragm 47 of each motor 44 will be pulled upwardly at the same time. This operation occurs instantly upon the operation of the treadle 125 and before energization of the booster motor 20 has had time to affect the conversion valve 72. The rapid upward movement of the diaphragm 47 incident to operation of the auxiliary motor 85 immediately displaces most of the air from the main motor chamber 70 through relief valve 61. While the pipe 71, prior to operation of the conversion valve, will be open to the atmosphere in the usual manner, the relatively small diameter of this pipe and the line friction occurring therein would prevent a free exhaustion of air from the chamber 70. Accordingly the valve 61 is provided and is of substantial diameter to permit the free escape of air from the chamber 70.

It will be obvious that with prior systems, a substantial volume of air must be withdrawn from the variable pressure chambers of the trailer-brake operating motors when the conversion valve starts to function in response to energization of the tractor booster motor. As a result, energization of the trailer brake motors results in a substantial drop in vacuum in the vacuum reservoirs. For example, where a vacuum of 20 inches of mercury is maintained in the vacuum reservoir, energization of the trailer brake operating motors results in a drop in vacuum to 15 or 16 inches of mercury. Thus the trailer brake motors are prevented from taking full advantage of the normal relatively high vacuum in the reservoir, and larger brake operating motors accordingly must be employed to compensate for such drop in vacuum.

With the present system, energization of the auxiliary motors 85 applies the trailer brakes and exhausts air from the motor chambers 70. The trailer brake shoes will be brought into engagement with the drums and from that point on very little movement of the motor diaphragms 47 is required for the reason that thereafter energization of the motors 44 merely builds up a higher static pressure between the brake shoes and the brake drums. In practice it has been found that nearly all of the air can be exhausted from the chambers 70 and so little air is left to affect the pressure in the vacuum reservoir 75 that very little drop in vacuum occurs when the motors 44 are energized through the normal functioning of the conversion valve 72. The use of the auxiliary motors 85 thus permits the use of smaller motors 44, or provides for a greater degree of energization of these motors if they are the customary size and the auxiliary motors 85 thus directly affect the functioning of the main trailer brake motors 44.

The operator can feel the increased deceleration of the vehicle when the trailer brake motors 44 start to function in response to operation of the conversion valve 72. The driver can thereupon release pressure on the treadle 125 and the main trailer brake motors 44 will then continue to function in the normal manner, the degree of braking force being proportional to the degree of energization of the booster motor 20.

There are two reasons why the motor 44 in the present construction can be made smaller than in prior constructions. The first reason has been explained above and resides in the fact that substantially the full normal vacuum in the reservoir 75 is available to the motors 44. The second reason lies in the fact that when a heavily loaded trailer is being hauled, the operator may hold his left foot depressed to maintain energization of the auxiliary motors 85 throughout any braking operation. In this case, the powers of the motors 44 and 85 will be added together to provide a greater braking action than can be accomplished with the motors 44 alone. The present system is therefore highly advantageous in that it provides three stages of trailer braking, namely, with the auxiliary motors 85 alone, with the motors 44 alone, with the treadle 125 released when operation of the motors 44 commences, and with the forces of all of the motors 44 and 85 added to each other when the heaviest braking action is desired. The controlling of the auxiliary motors 85 by the left foot treadle 125 provides an additionally highly advantageous system. When "jackknifing" is anticipated or has commenced, the operator may depress the pedal 125 to snub the trailer brakes and may simultaneously depress the accelerator pedal with his right foot to accelerate the tractor engine. These two operations have the highly advantageous effect of relatively pulling the tractor and trailer away from each other to prevent "jackknifing" or to cure this condition if it has commenced.

From the foregoing it will be apparent that the present system divorces from the conventional tractor-trailer braking system the means employed for instantly initially applying the trailer brakes when desired. At the same time, the mechanism directly cooperates with the trailer brake motors by operating them independently of differential pressures therein to displace air therefrom and thus prevent a substantial drop in vacuum in the vacuum reservoir 75 when the main trailer brake motors function in response to operation of the brake pedal. The system is further highly advantageous in providing for different degrees of trailer brake application, and this is a result which is impossible with the latest systems referred to wherein initial movement of the brake pedal operates an auxiliary means for initially applying the trailer brakes and wherein such auxiliary means is automatically rendered inoperative upon the normal functioning of the conversion valve. The left foot treadle 125 renders the use of a hand valve wholly unnecessary and permits the operator to snub the trailer brakes and simultaneously accelerate the tractor engine.

I claim:

1. A vehicle braking mechanism comprising a fluid pressure operated motor having mechanical connections for operating the brakes, said motor having a variable pressure chamber normally connected to the atmosphere and a pressure responsive member operable upon a drop in pressure in said chamber for operating the brakes, a vacuum reservoir, valve mechanism controlling connection of said chamber to said reservoir, an auxiliary motor for operating the brake, said first-named motor having a relief valve and said auxiliary motor having mechanical connection with said pressure responsive member and operable when actuated for moving said pressure responsive member for discharging air from said chamber through said relief valve, a second vacuum reservoir, and valve mechanism controlling connection of said auxiliary motor to said second reservoir.

2. A vehicle braking mechanism comprising a fluid pressure operated motor having mechanical connections for operating the brakes, said motor having a variable pressure chamber normally connected to the atmosphere and a pressure responsive member operable upon a drop in pressure in said chamber for operating the brakes, a vacuum reservoir, valve mechanism controlling connection of said chamber to said reservoir, an auxiliary fluid pressure operated motor having a variable pressure chamber and a member responsive to pressures therein and mechanically connected to said first-named pressure responsive member to move the latter and reduce the size of said first-named chamber, said first-named motor having a relief valve for the discharge of air from said first-named variable pressure chamber upon movement of said first-named pressure responsive member by said second-named pressure responsive member, a second vacuum reservoir, and valve mechanism controlling connection of said auxiliary motor to said second reservoir.

3. A vehicle brake operating mechanism comprising brake operating connections, a main brake operating motor having a pressure responsive member dividing it into a pair of chambers one of which is a variable pressure chamber and is normally connected to the atmosphere, an auxiliary motor having a power movable member, said power movable member and said pressure responsive member having mechanical connection with each other and with said brake operating connections, separate pressure differential reservoirs for said motors, separate valve means for connecting said motors respectively to said sources independently of each other, and a relief valve carried by said main motor and operable upon movement of said pressure responsive member by the movable member of said auxiliary motor for relieving air pressure in said variable pressure chamber.

4. A vehicle brake operating mechanism comprising mechanical connections for operating the brake, a main brake operating motor and an auxiliary brake operating motor each comprising a pair of chambers and a pressure responsive member, one chamber of each motor being a variable pressure chamber and the variable pressure chamber of said main motor being normally connected to the atmosphere, the pressure responsive members of said motors having mechanical connection with each other and with said brake operating connections, separate pressure sources for said motors, a first control valve means for connecting the variable pressure chamber of said main motor to one of said sources and normally connecting such chamber to the atmosphere, a second control valve means for connecting the variable pressure chamber of said auxiliary motor to the other of said sources to apply the brakes and move the pressure responsive member of said main motor, to reduce the capacity of the variable pressure chamber thereof, and a relief valve carried by said main motor and opening outwardly of the variable pressure chamber thereof for the discharge of air therefrom upon movement of the pressure responsive member of said main motor by the pressure responsive member of said auxiliary motor.

5. A brake operating mechanism comprising mechanical connections for operating the brake, a fluid pressure operated motor having a pressure responsive member connected to said mechanical connections, said pressure responsive member dividing said motor into a pair of chambers one of which is a variable pressure chamber and the other of which is a constant pressure chamber, a vacuum reservoir, control valve mechanism normally connecting said variable pressure chamber to the atmosphere and operable for disconnecting it from the atmosphere and connecting it to said vacuum reservoir, power means operable independently of said motor, control valve mechanism and said reservoir, prior to operation of said valve mechanism for moving said pressure responsive member to decrease the size of said variable pressure chamber, and valve means providing for the escape of air from said variable pressure chamber independently of said valve mechanism when said pressure responsive member reduces the capacity thereof by operation of said independently operable means.

6. A brake operating mechanism comprising mechanical connections for operating the brake, a fluid pressure operated motor having a pressure responsive member connected to said mechanical connections, said pressure responsive member dividing said motor into a pair of chambers one of which is a variable pressure chamber and the other of which is a constant pressure chamber, a vacuum reservoir, control valve mechanism normally connecting said variable pressure chamber to the atmosphere and operable for disconnecting it from the atmosphere and connecting it to said vacuum reservoir, a power device having mecanical connection with said pressure responsive member, a power source for said power device independent of said reservoir, manually controllable means for energizing said power device from said source to move said pressure responsive member to reduce the capacity of said variable pressure chamber prior to operation of said control valve mechanism, and an outwardly opening relief valve operable upon an increase in pressure in said variable pressure chamber above atmospheric pressure to provide for the escape of air from said chamber.

7. A brake operating mechanism comprising mechanical connections for operating the brake, a fluid pressure operated motor having a pressure responsive member connected to said mechanical connections, said pressure responsive member dividing said motor into a pair of chambers one of which is a variable pressure chamber and the other of which is a constant pressure chamber, a vacuum reservoir, control valve mechanism normally connecting said variable pressure chamber to the atmosphere and operable for disconnecting it from the atmosphere and connecting it to said vacuum reservoir, an auxiliary fluid pressure operated motor having a diaphragm dividing it into two chambers one of which is a vacuum chamber and the other of which is normally a sub-atmospheric pressure chamber, a vacuum source separate from said reservoir normally connected to both chambers of said auxiliary motor, means connecting said diaphragm and said pressure responsive member, means for connecting said sub-atmospheric pressure chamber to the atmosphere and disconnecting it from said source to actuate said diaphragm and move said pressure responsive member to reduce the capacity of said variable pressure chamber, and an outwardly opening relief valve for said variable pressure chamber for relieving pressures therein above atmospheric pressure.

8. In a tractor-trailer brake system, a pedal-controlled booster for actuating the tractor brakes and including a motor having a variable pressure chamber, mechanical connections for operating the trailer brakes, a fluid pressure trailer brake operating motor connected to said mechanical connections a source of pressure differential for said trailer brake operating motor, a conversion valve mechanism controlled by pressure in the variable pressure chamber of said booster motor for energizing said trailer brake operating motor from said source to a degree proportional to the degree of operation of said booster, an auxiliary trailer brake operating motor connected to said mechanical connections, a power source for said auxiliary motor, and means operable wholly independently of said booster for energizing said auxiliary trailer brake operating motor from said power source whereby the two trailer brake operating motors may be energized selectively or simultaneously.

9. A vehicle brake operating mechanism comprising mechanical connections for operating the brake, a pair of fluid pressure operated motors each having a pressure movable member, a rod extending between said motors and connecting the pressure movable members thereof whereby movement of one of such members will move the other, said rod having mechanical connection with said mechanical connections, separate sources of pressure differential for said motors, and independently operable control valve means for connecting the respective pressure sources to said motors whereby said motors are selectively or simultaneously energizable.

10. A vehicle brake operating mechanism comprising mechanical connections for operating the brake, a pair of fluid pressure operated motors each having a pressure movable member, a rod extending between said motors and connecting the pressure movable members thereof whereby movement of one of such members will move the other, said rod having mechanical connection with said mechanical connections, separate pressure differential sources for said motors, independently operable control means for establishing differential pressures in said motors from the respective sources whereby said motors are selectively or simultaneously energizable, one of said motors having a variable pressure chamber normally connected to the atmosphere and connectible to a source of sub-atmospheric pressure upon operation of the control means of such motor, and an outwardly opening relief valve for relieving pressure above atmospheric pressure from said variable pressure chamber upon energization of the other of said motors.

11. In a tractor-trailer brake system, mechanical connections for operating the trailer brakes, pedal-controlled means for operating both the tractor and trailer brakes and comprising a power device having mechanical connection with said mechanical connections and having a power source to which it is connected upon operation of said pedal-controlled means, a second power device connected to said mechanical connections, a separate source of power for said second power device and control means operable for connecting said second power device to said separate source, said control means and said pedal-controlled means being independently operable whereby said power devices are selectively or simultaneously operable.

12. In a tractor-trailer brake system, mechanical connections for operating the trailer brakes, brake operating means for both the tractor and trailer brakes including a control pedal and a fluid pressure operated motor connected to said mechanical connections, a second fluid pressure operated motor in axial alinement with said first named motor, said motors having pressure responsive members therein connected to each other whereby operation of either motor will actuate said mechanical connections, separate sources of pressure differential for said motors, valve means operable upon operation of said pedal for connecting said first-named motor to one of said pressure sources, and valve means for connecting said second motor to the other pressure source wholly independently of said pedal whereby said motors are selectively or simultaneously operable.

13. Apparatus constructed in accordance with claim 12 wherein said first-named motor has a variable pressure chamber normally connected to the atmosphere and connectible to a source of sub-atmospheric pressure, said variable pressure chamber having an outwardly opening relief valve whereby, when movement of the pressure responsive member in such motor incident to operation of said second motor reduces the size of said chamber, pressure above atmospheric pressure will be released from said chamber.

14. Apparatus constructed in accordance with claim 12 wherein said first-named motor is provided with atmospheric chamber, and a variable pressure chamber normally connected to the atmosphere and connectible to a source of sub-atmospheric pressure, and a relief valve carried by the pressure-responsive member of said first-named motor and opening into said atmospheric chamber to relieve pressures above atmospheric pressure from said variable pressure chamber.

15. In a tractor-trailer brake system, wherein a booster operates the tractor brakes and is controlled by a right-foot pedal and wherein the booster includes a fluid pressure motor the energization of which controls the application of differential fluid pressures to a trailer brake operating motor to apply the trailer brakes proportionate to application of the tractor brakes, said trailer brake motor having a pressure differential reservoir, an auxiliary motor for operating the trailer brakes, a second pressure differential reservoir for said auxiliary motor, and valve means for connecting said auxiliary motor to said second reservoir comprising a left-foot treadle operable independently of said pedal whereby the two trailer brake operating motors are selectively or simultaneously operable.

16. Apparatus constructed in accordance with claim 15 wherein both trailer brake motors are fluid pressure operated and each is provided with a pressure responsive member for operating the trailer brakes, said pressure responsive members being connected to each other whereby operation of one moves the other, the first named trailer brake operating motor having a variable pressure chamber normally connected to the atmosphere and connectible to a source of sub-atmospheric pressure, said chamber having a relief valve for relieving pressure above atmospheric pressure upon operation of the pressure responsive member of said first-named motor upon operation of said auxiliary motor.

17. In a tractor-trailer brake system, a pedal-controlled booster for actuating the trailer brakes and including a motor having a variable pressure chamber, mechanical connections for operating the trailer brakes, a fluid pressure trailer brake operating motor connected to said mechanical connections, a source of pressure differential, a conversion valve mechanism controlled by pressure in the variable pressure chamber of said booster motor for energizing said trailer brake operating motor from said source to a degree proportional to the degree of operation of said booster, an auxiliary trailer brake operating motor connected to said mechanical connections and having a variable pressure chamber, a second source of pressure differential, a normally closed valve controlling communication between said second source and the variable pressure chamber of said auxiliary motor, a solenoid energizable for opening said valve, and a circuit for said solenoid including a switch accessible to the driver of the tractor.

JEANNOT G. INGRES.

REFERENCES CITED

The following references are of record in the file of this patent:

UNITED STATES PATENTS

| Number | Name | Date |
|---|---|---|
| 825,866 | Rogers | July 10, 1906 |
| 1,650,286 | Livingston | Nov. 22, 1927 |
| 2,057,707 | Carroll | Oct. 20, 1936 |
| 2,185,261 | Leupold | Jan. 2, 1940 |
| 2,305,638 | Rockwell | Dec. 22, 1942 |
| 2,365,557 | Keith | Dec. 19, 1944 |
| 2,373,272 | Stelzer | Apr. 10, 1945 |
| 2,416,222 | Rodway | Feb. 18, 1947 |

FOREIGN PATENTS

| Number | Country | Date |
|---|---|---|
| 12,661 | Great Britain | May 23, 1912 |